US007389177B2

(12) United States Patent
Grimes et al.

(10) Patent No.: US 7,389,177 B2
(45) Date of Patent: Jun. 17, 2008

(54) SIGNAL TRANSFER SYSTEM FOR DISTRIBUTING ENGINE POSITION SIGNALS TO MULTIPLE CONTROL MODULES

(75) Inventors: Michael R. Grimes, Saline, MI (US); Lawrence P. Carrion, Rochester Hills, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 0 days.

(21) Appl. No.: 11/137,825

(22) Filed: May 25, 2005

(65) Prior Publication Data

US 2006/0271272 A1 Nov. 30, 2006

(51) Int. Cl.
*G06F 19/00* (2006.01)
*B60T 7/12* (2006.01)

(52) U.S. Cl. ........................ 701/115; 701/103; 701/114

(58) Field of Classification Search ................ 701/101, 701/102, 111, 112, 114, 115
See application file for complete search history.

(56) References Cited

U.S. PATENT DOCUMENTS

| | | | | |
|---|---|---|---|---|
| 4,255,789 | A * | 3/1981 | Hartford et al. | 701/108 |
| 4,309,759 | A * | 1/1982 | Tokuda et al. | 701/105 |
| 4,517,648 | A * | 5/1985 | Ina et al. | 701/99 |
| RE32,140 | E * | 5/1986 | Tokuda et al. | 701/115 |
| 5,390,351 | A * | 2/1995 | Di Giulio et al. | 709/225 |
| 5,452,419 | A * | 9/1995 | Di Giulio et al. | 709/200 |
| 5,499,374 | A * | 3/1996 | Di Giulio et al. | 710/240 |
| 2004/0258251 | A1* | 12/2004 | Inoue et al. | 381/71.4 |

* cited by examiner

*Primary Examiner*—John T Kwon

(57) ABSTRACT

A signal transfer system for regulating operation of an internal combustion engine includes a shaft that is rotatably driven within an engine. A sensor is responsive to the rotation of the shaft and generates a data signal based on the rotation. A communications bus receives the data signal and generates a replicated data signal based. A first control module receives the replicated data signal and regulates operation of the vehicle based on the replicated data signal.

24 Claims, 3 Drawing Sheets

SIGNAL TRANSFER SYSTEM FOR DISTRIBUTING ENGINE POSITION SIGNALS TO MULTIPLE CONTROL MODULES

FIELD OF THE INVENTION

The present invention relates to relaying sensor signals, and more particularly to a signal transfer system for relaying an engine position signal.

BACKGROUND OF THE INVENTION

A vehicle engine includes components that work together to generate drive torque. These components include, but are not limited to, a crankshaft, cylinders, pistons, fuel injectors and sparkplugs. An engine or powertrain control module regulates engine operation based on engine operating parameters including, but not limited to, a rotational position of the crankshaft and a rotational position of a camshaft.

A sensor monitors the crankshaft position and generates a crankshaft position data signal based thereon. Another sensor monitors the camshaft position and generates a camshaft position data signal based thereon. The signals may be used by multiple control modules that regulate vehicle operation. Distribution of the signals to the multiple control modules results in degeneration or weakening of the signals. As a result, noise and other imperfections are generated in the signals, decreasing signal and control accuracy.

SUMMARY OF THE INVENTION

Accordingly, the present invention provides a signal transfer system for regulating operation of an internal combustion engine. The signal transfer system includes a shaft that is rotatably driven within an engine. A sensor is responsive to the rotation of the shaft and generates a data signal based on the rotation. A communications bus receives the data signal and generates a replicated data signal based. A first control module receives the replicated data signal and regulates operation of the vehicle based on the replicated data signal.

In one feature, the shaft is a crankshaft and the data signal indicates the rotational position of the crankshaft.

In another feature, the shaft is a camshaft and the signal indicates the rotational position of the camshaft.

In another feature, the communication channel includes a serial data bus.

In another feature, the serial data bus includes a communications bus and a replication module.

In another feature, the replication module generates the replicated data signal.

In still another feature, the first control module processes the replicated data signal and generates a control signal based on the replicate data signal.

In another feature, the replicated data signal is generated by amplifying the data signal.

In another feature, the sensor is responsive to a toothed wheel fixed for rotation with the shaft.

In yet another feature, the communications bus is integrated into the first control module.

In still another feature, the replicated data signal is sent to a second control module.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
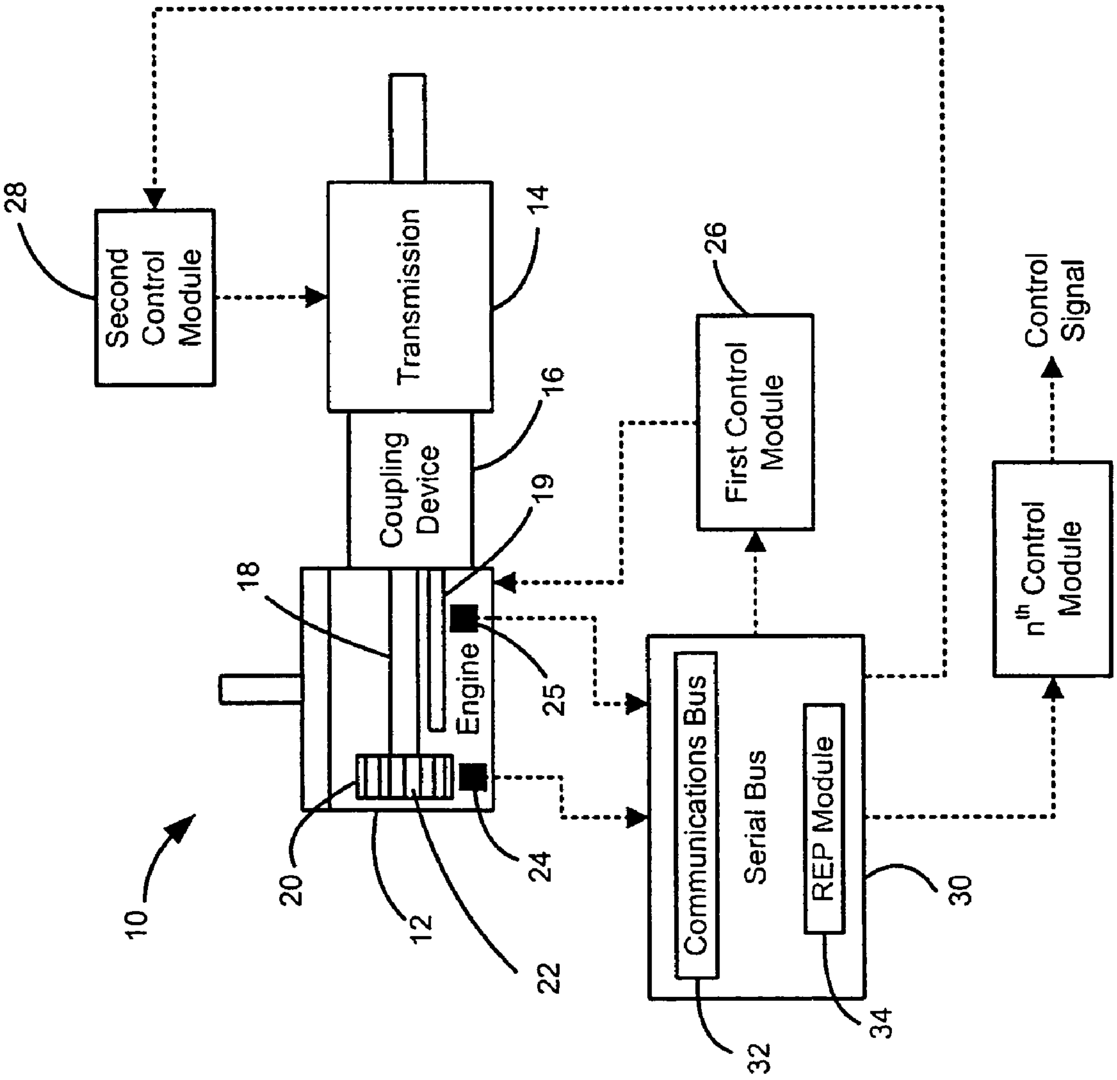
FIG. 1 is a functional block diagram of a vehicle signal transfer system including a signal bus according to the present invention.

The following description of the preferred embodiment is merely exemplary in nature and is in no way intended to limit the invention, its application, or uses. For purposes of clarity, the same reference numbers will be used in the drawings to identify similar elements. As used herein, the term module refers to an application specific integrated circuit (ASIC), an electronic circuit, a processor (shared, dedicated, or group) and memory that execute one or more software or firmware programs, a combinational logic circuit, and/or other suitable components that provide the described functionality.

Referring now to FIG. 1, a vehicle 10 is schematically illustrated. The vehicle 10 includes an engine 12, a transmission 14 and a coupling device 16. The transmission 14 can be one of various types known in the art including, but not limited to, a manual, an automatic, a continuously variable (CVT) or an automated manual transmission (AMT). The coupling device 16 can include a clutch or a torque converter, depending on the specific transmission type. The engine 12 generates drive torque that is transferred to the transmission 14 via the coupling device 16.

The engine 12 includes a crankshaft 18 that is rotatably driven by pistons (not shown). The pistons are driven in cylinders (not shown) during the combustion process. A toothed wheel 20 is fixed for rotation with the crankshaft 18. The wheel 20 includes a plurality of equally spaced teeth 22. However, the wheel 20 also includes an oversized space or gap between a pair of teeth 22. For example, although an exemplary wheel 20 could accommodate 60 equally spaced teeth, the exemplary wheel includes 58 teeth with a gap having a width equal to two teeth therebetween. A rotational position of the gap indicates a rotational position of the crankshaft 18.

A sensor 24 monitors rotation of the wheel 20 and generates a pulse data signal based on the rotational position of the wheel 20. More specifically, as an oncoming edge of a tooth 22 is detected by the sensor 24, the signal goes high and remains high as the tooth 22 passes the sensor 24. As the off-going edge of the tooth 22 is detected by the sensor 24, the signal goes low and remains low until the on-coming edge of an adjacent tooth 22 is detected. The gap provides a point of reference for the sensor 24. More specifically, the position of the crankshaft 18 can be determined based on the extended distance between signal pulses resulting from the gap during the rotation of the wheel 20. The rotational position of the crankshaft 18 can be determined at any point based on the distance between a current pulse and the extended low pulse resulting from passage of the gap.

The engine 12 also includes a camshaft 19 that is rotatably driven by the crankshaft 18. The camshaft 19 regulates opening and closing of intake and exhaust valves (not shown) of the engine 12. A sensor 25 monitors a rotational position of the camshaft 19 based on a toothed wheel (not illustrated) as similarly described above with respect to monitoring the rotational position of the crankshaft 18.

The vehicle 10 also includes first and second control modules 26, 28, respectively. The first control module 26 and the second control module 28 generate control signals to regulate vehicle operation based on the data signal. For example, the first control module 26 can include an engine control module (ECM) that regulates engine operation. The second control module 28 can include a transmission control module (TCM) that regulates operation of the transmission 14. Although two control modules are illustrated, it is appreciated that additional control modules can be implemented that generate control signals based on the data signal.

The vehicle 10 further includes a serial bus 30 that receives the data signal from the sensor 24. The serial bus 30 generates a replicated data signal by amplifying the original data signal. More specifically, the serial bus includes a communications bus 32 and a replication module 34. The replication module 34 amplifies the data signal to increase the current strength of the data signal. The communications bus 32 distributes data signals to the first and second control modules 26,28.

Figure 2:
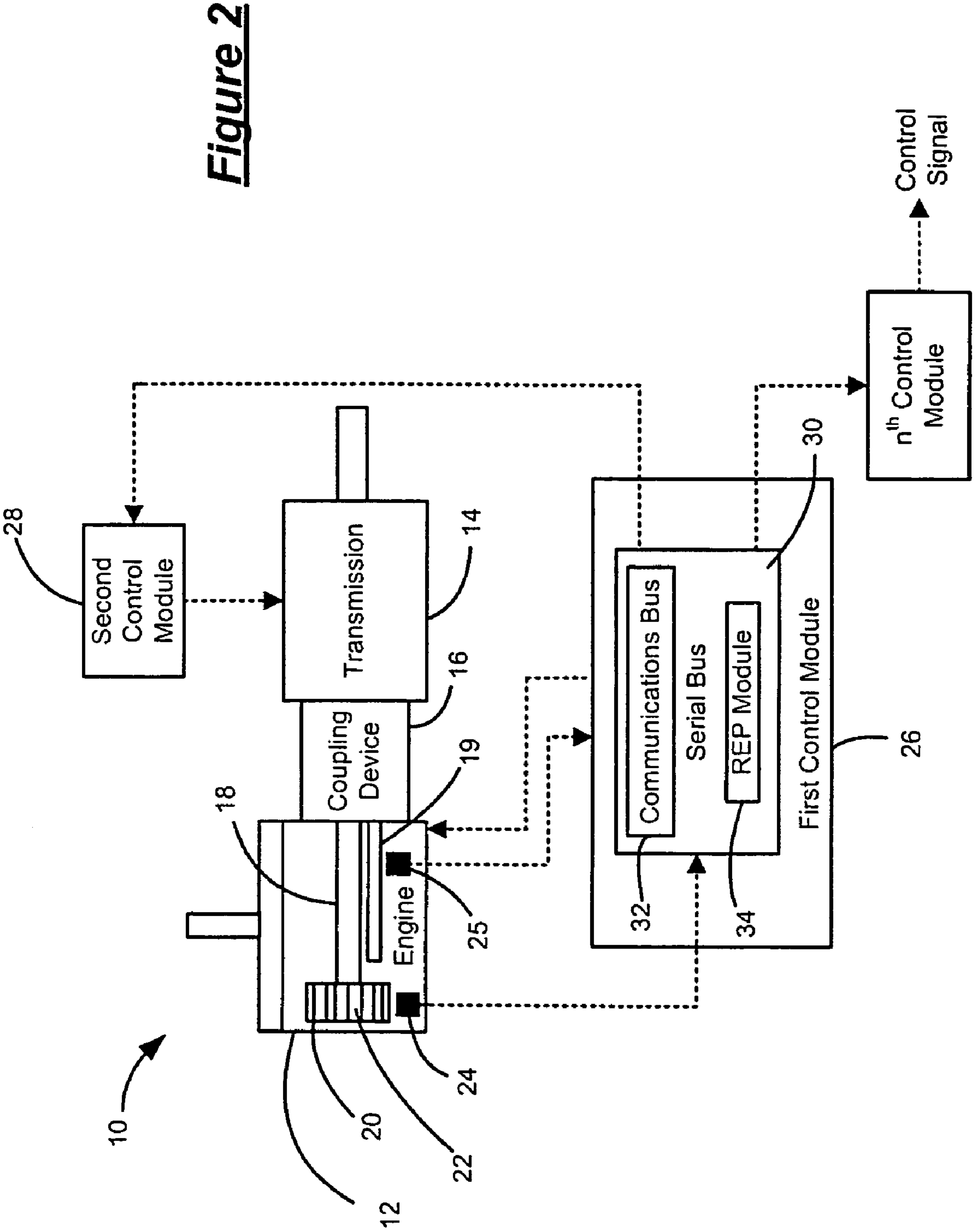
FIG. 2 is a functional block diagram of a vehicle signal transfer system with the signal bus integrated into a first control module.

The replicated data signal is distributed to the control modules 26,28 by the serial data bus 30. It is further anticipated that the original signal can be provided to at least one of the control modules 26,28. The serial data bus 30 is electrically isolated to inhibit corruption of the data signal in the event of a short or electrical spike in a connected component. More specifically, the serial data bus 30 includes an electrical ground (not illustrated). Although the serial bus 30 is illustrated as an independent component, it is anticipated that the serial bus 30 can be integrated in one of the control modules (See FIG. 2).

Figure 3:
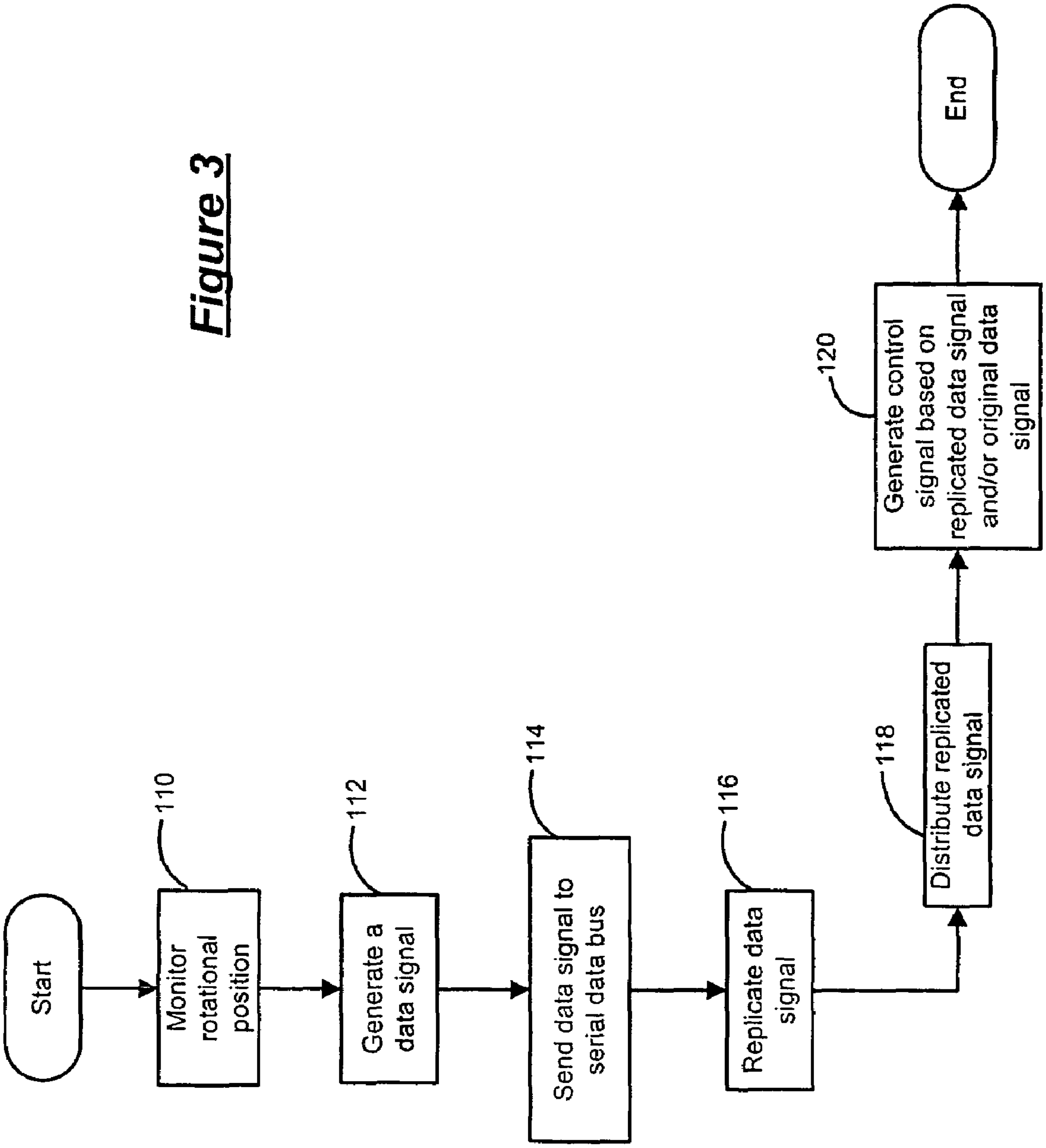
FIG. 3 is a flow chart illustrating steps executed by the vehicle signal transfer system.

Referring now to FIG. 3, a flowchart illustrates the signal transfer process of the present invention. A sensor 24,25 is responsive to the rotational position of a shaft 18,19 in step 110. In step 112, a data signal is generated based on the rotational position. In step 114, the data signal is fed to the serial data bus 30. The data signal is amplified and replicated by the serial bus 30 in step 116. In step 118, the replicated data signal is distributed to the first and second control modules 26,28. The original, non-replicated data signal can also be transferred to at least one of the first and second control module 26,28. In step 120, the first and second control modules 26,28 generate respective control signals based on the replicated data signal.

The present invention eliminates noise or faults in the original data signal by electrically isolating the data signal and using a serial data bus 30 to amplify and produce a replicated data signal. The serial bus 30 distributes the amplified, replicated data signal to the first and second control modules 26,28. As a result, the control modules 26,28 receive the replicated data signal with a minimal amount of noise and/or error.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

What is claimed is:

1. A signal transfer system for a vehicle, comprising:
- a shaft that is rotatably driven within an engine;
- a sensor that is responsive to rotation of said shaft and that generates an original data signal based on said rotation;
- a communications channel that receives said original data signal and that generates a replicated data signal based on said data signal;
- a first control module that receives said replicated data signal and that regulates operation of said vehicle based on said replicated data signal; and
- a second control module that receives said original data signal and that regulates operation of said vehicle based on said original data signal.

2. The signal transfer system of claim 1 wherein said shaft is a crankshaft and said original data signal indicates a rotational position of said crankshaft.

3. The signal transfer system of claim 1 wherein said shaft is a camshaft and said original data signal indicates a rotational position of said camshaft.

4. The signal transfer system of claim 1 wherein said communications channel includes a serial data bus.

5. The signal transfer system of claim 4 wherein said serial data bus includes a communications bus and a replication module.

6. The signal transfer system of claim 5 wherein said replication module generates said replicated data signal.

7. The signal transfer system of claim 1 wherein said first control module processes said replicated data signal and generates a control signal based on said replicated data signal.

8. The signal transfer system of claim 1 wherein said replicated data signal is generated by amplifying said original data signal.

9. The system of claim 1 wherein said sensor is responsive to a toothed wheel fixed for rotation with said shaft.

10. The system of claim 1 wherein said communications channel is integrated into said first control module.

11. The system of claim 1 wherein said replicated data signal is sent to a third control module.

12. A method of transferring data signals in a vehicle control system to regulate operation of an internal combustion engine, comprising:
- monitoring a rotational position of a shaft of said engine;
- generating an original data signal based on said rotational position;
- transferring said original data signal to a communications channel;
- generating a replicated data signal based on said original data signal; and
- regulating operation of said engine based on said replicated data signal and said original data signal.

13. The method of claim 12 wherein said communications bus amplifies said original data signal.

14. The method of claim 12 wherein said communications channel includes a serial data bus.

15. The method of claim 14 wherein said serial data bus includes a communications bus and a replication module.

16. The method of claim 15 wherein said replication module generates said replicated data signal.

17. The method of claim 12 further comprising generating a control signal to regulate said engine based on said replicated data signal.

18. A method of transferring a data signal to multiple control modules in a vehicle, comprising:

generating an original data signal that represents a vehicle state;

receiving and transmitting said original data signal using a communications channel;

amplifying and replicating said original data signal to provide a replicated data signal; and generating vehicle control signals based on said replicated data signal and said original data signal.

19. The method of claim 18 wherein a sensor monitors said vehicle state and generates said original data signal.

20. The method of claim 18 wherein said communications channel amplifies said original data signal to reduces noise and errors on said original data signal.

21. The method of claim 20 wherein said communications channel includes a serial data bus.

22. The method of claim 21 wherein said serial data bus includes a communications bus and a replication module.

23. The method of claim 22 wherein said replication module generates said replicated data signal.

24. The method of claim 18 wherein a control module generates a control signal based on said replicated data signal.

* * * * *